(12) United States Patent
Beri et al.

(10) Patent No.: US 11,301,125 B2
(45) Date of Patent: Apr. 12, 2022

(54) VECTOR OBJECT INTERACTION

(71) Applicant: ADOBE INC., San Jose, CA (US)

(72) Inventors: Tarun Beri, Noida (IN); Tarun Gehlaut, Faridabad (IN); Siddharth Bhasin, New Delhi (IN); Ankit Aggarwal, Faridabad (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/857,696

(22) Filed: Apr. 24, 2020

(65) Prior Publication Data
US 2021/0333960 A1 Oct. 28, 2021

(51) Int. Cl.
*G06F 3/0486* (2013.01)
*G06T 11/60* (2006.01)
*G06F 3/0484* (2013.01)
*G06F 3/0482* (2013.01)
*G06F 3/04845* (2022.01)

(52) U.S. Cl.
CPC .......... *G06F 3/0486* (2013.01); *G06F 3/0482* (2013.01); *G06F 3/04845* (2013.01); *G06T 11/60* (2013.01); *G06T 2200/24* (2013.01)

(58) Field of Classification Search
CPC .. G06F 3/0486; G06F 3/0482; G06F 3/04845; G06T 11/60; G06T 2200/24
See application file for complete search history.

(56) References Cited

U.S. PATENT DOCUMENTS

| | | | | |
|---|---|---|---|---|
| 5,598,524 A * | 1/1997 | Johnston, Jr. | ......... | G06F 3/0486 715/769 |
| 5,754,179 A * | 5/1998 | Hocker | ................ | G06F 3/0481 715/835 |
| 6,020,895 A * | 2/2000 | Azami | ................ | G06F 3/0481 345/619 |
| 7,043,695 B2 * | 5/2006 | Elber | .................... | G06T 17/00 345/418 |

(Continued)

OTHER PUBLICATIONS

Denis Howe, type, The Free Online Dictionary of Computing, <https://foldoc.org/type> (Year: 2003).*

(Continued)

*Primary Examiner* — Justin R. Blaufeld
(74) *Attorney, Agent, or Firm* — Shook, Hardy & Bacon L.L.P.

(57) ABSTRACT

Techniques are described for performing inter-object interactions between vector objects to adjust the appearance of one vector object based on another vector object. For example, a vector object interaction framework may be implemented in which designers drag a vector object onto another vector object to trigger an interaction between the objects. Candidate interactions between pairs of object types may be pre-defined and stored in a suitable data structure. Thus, when one vector object is dragged onto a recipient vector object and a pause is detected, the object types for the dragged and recipient objects may be determined, and a corresponding set of candidate interactions for the pair of object types may be accessed, ranked, simulated, and/or (Continued)

presented as selectable previews. As such, one of the candidate interactions may be selected and executed to form one or more output vector objects that may be saved, exported, modified, and/or reused.

20 Claims, 10 Drawing Sheets

(56) References Cited

U.S. PATENT DOCUMENTS

| | | | | |
|---|---|---|---|---|
| 7,908,278 | B2* | 3/2011 | Akkiraju | G06F 8/34 |
| | | | | 707/748 |
| 8,847,983 | B1* | 9/2014 | Ranganathan | G06T 11/60 |
| | | | | 345/629 |
| 10,642,590 | B2* | 5/2020 | Siraparapu | G06F 8/52 |
| 2006/0001679 | A1* | 1/2006 | Hamburg | G06T 11/60 |
| | | | | 345/620 |
| 2007/0016872 | A1* | 1/2007 | Cummins | G06F 3/04817 |
| | | | | 715/769 |
| 2008/0051989 | A1* | 2/2008 | Welsh | G06T 11/00 |
| | | | | 701/532 |
| 2009/0051698 | A1* | 2/2009 | Boose | G06F 16/56 |
| | | | | 345/619 |
| 2009/0080801 | A1* | 3/2009 | Hatfield | G06T 11/60 |
| | | | | 382/283 |
| 2009/0204594 | A1* | 8/2009 | Akkiraju | G06F 8/34 |
| 2010/0077329 | A1* | 3/2010 | Korn | G06F 3/0481 |
| | | | | 715/764 |
| 2012/0005577 | A1* | 1/2012 | Chakra | G06F 8/38 |
| | | | | 715/702 |
| 2012/0110073 | A1* | 5/2012 | Chakra | G06Q 10/101 |
| | | | | 709/204 |
| 2012/0293558 | A1* | 11/2012 | Dilts | G06T 11/80 |
| | | | | 345/676 |
| 2013/0042259 | A1* | 2/2013 | Urbach | G06F 3/0486 |
| | | | | 719/329 |
| 2013/0104037 | A1* | 4/2013 | Doan | G06F 40/197 |
| | | | | 715/255 |
| 2013/0159904 | A1* | 6/2013 | Kelappan | G06F 3/0481 |
| | | | | 715/769 |
| 2014/0022257 | A1* | 1/2014 | Berg | G06T 11/206 |
| | | | | 345/441 |
| 2015/0012862 | A1* | 1/2015 | Ikeda | G06F 3/0485 |
| | | | | 715/770 |
| 2015/0015504 | A1* | 1/2015 | Lee | G06T 11/206 |
| | | | | 345/173 |
| 2015/0248212 | A1* | 9/2015 | Breedvelt-Schouten | |
| | | | | G06Q 10/10 |
| | | | | 715/850 |
| 2016/0140741 | A1* | 5/2016 | George | G06T 11/40 |
| | | | | 345/441 |
| 2016/0231888 | A1* | 8/2016 | Govindraj | G06F 3/0485 |
| 2016/0275366 | A1* | 9/2016 | Yamamoto | G06T 11/60 |
| 2018/0137659 | A1* | 5/2018 | Sharma | G06T 11/203 |
| 2018/0357801 | A1* | 12/2018 | Rasheed | G06T 11/60 |
| 2018/0365813 | A1* | 12/2018 | Leong | G06T 5/50 |
| 2019/0025999 | A1* | 1/2019 | Murphy | G06F 3/04817 |
| 2019/0087994 | A1* | 3/2019 | Mizutani | H04N 1/00167 |
| 2019/0108662 | A1* | 4/2019 | Donahue | G06T 3/40 |
| 2019/0346986 | A1* | 11/2019 | Nilo | G06F 3/0488 |

OTHER PUBLICATIONS

IEEE, Authoritative Dictionary of IEEE Standards Terms 182 and 1226 (7th Ed. 2000) (defining "type" as a "category into which attribute values are placed on the basis of their purpose" and cross-referencing with "class," the latter having the same definition as applied to objects). (Year: 2000).*

92 Adobe Press, Editing and Combining Shapes and Paths (Mar. 25, 2017) <https://www.adobepress.com/articles/printerfriendly/2756475>. (Year: 2017).*

Clem, Alex. A Complete Guide to the Procreate App (Sep. 7, 2018). In Shutterstock (online).Retrieved from the internet: <https://www.shutterstock.com/blog/how-to-use-procreate-app> on Mar. 23, 2020.

Drag and drop colors. (Sep. 12, 2017). In Affinity Support (online). Retrieved from the internet: < https://forum.affinity.serif.com/index.php?/topic/46667-drag-and-drop-colors/ > on Mar. 23, 2020.

* cited by examiner

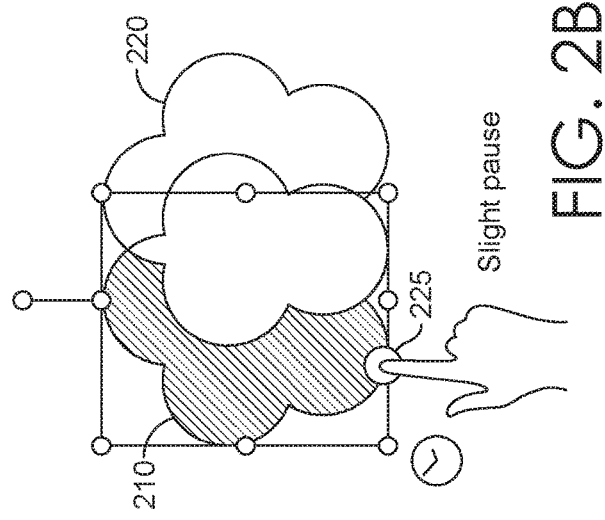
FIG. 2B
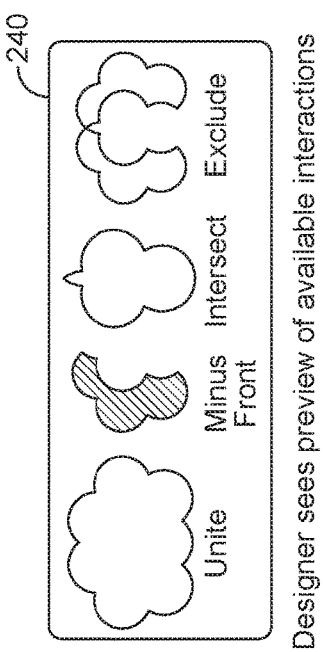
FIG. 2C
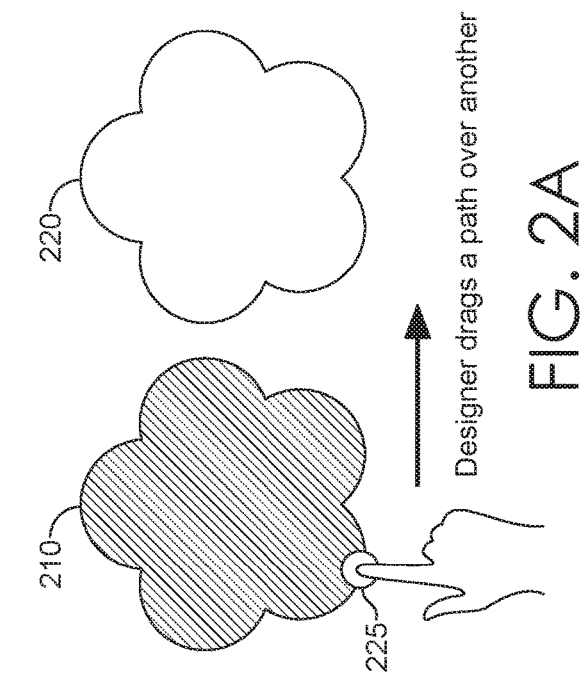
FIG. 2A
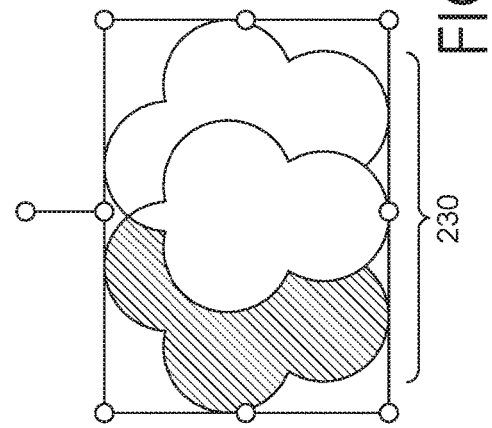

BEFORE AFTER

User drops a color on an object

Color gets applied on the object

BEFORE AFTER

Hello World!
From Proteus

*Hello World!*
*From Proteus*

User drops a font on a text object

Font gets applied on the text object

VECTOR OBJECT INTERACTION

BACKGROUND

Vector graphics (also called vector objects or vector images) are images made up of vectors that define lines and curves. For example, a vector object may be defined by a set of two-dimensional points and a set of paths such as lines or curves connecting the points. A vector object may have a defined set of properties such as stroke thickness, color, shape, curve, fill, or opacity, to name a few examples. Unlike raster graphics, which are composed with pixels, vector graphics can be defined mathematically, so they can be scaled to any size without loss of quality. This resolution independence makes vector graphics adaptable to many applications, including logos, clothing, product packaging, signs, and billboards.

SUMMARY

Embodiments of the present invention are directed to techniques for performing inter-object interactions between vector objects, and more specifically, adjusting the appearance of one vector object based on another vector object. For example, a vector object interaction framework may be implemented in which designers drag a vector object onto another vector object to trigger an interaction between the objects. Generally, a pause during a drag and drop operation may be used to indicate an intent to perform an inter-object interaction. As such, upon detecting some threshold pause duration during a drag operation without input velocity and/or input location exceeding corresponding thresholds, a set of candidate interactions may be identified for a pair of dragged and recipient objects. Candidate interactions for a pair of dragged and recipient vector objects may be identified based on object types (e.g., classifications) for the pair of vector objects. Thus, when one vector object is dragged onto a recipient vector object and a pause is detected, the object types for the dragged and recipient objects may be determined, and a corresponding set of candidate interactions for the pair of object types may be accessed, ranked, simulated, and/or presented as selectable previews. As such, one of the candidate interactions may be selected and executed to form one or more output vector objects that may be saved, exported, modified, and/or reused.

Candidate interactions between pairs of object types (e.g., classifications) may be pre-defined and stored in a suitable data structure(s). An example set of supported classifications for vector objects may include text-type, image-type, path-type, group-type, and custom-type. Different sets of candidate interactions may be defined and stored for different combinations of object types. Thus, different sets of candidate interactions may be defined for different combinations of object types, such as text-type and path-type vector objects (text-path interactions), path-type and path-type vector objects (path-path interactions), image-type and group-type vector objects (image-group interactions), custom-type and path-type vector objects (custom-path interactions), and custom-type and text-type vector objects (custom-text interactions) to name a few possibilities.

In some embodiments, one or more previewed results for a set of candidate interactions may be presented. For example, upon identifying a recipient object that satisfies an interaction metric while a drag operation is still pending, a preview of candidate interactions for the dragged and recipient objects may be presented. In some cases, the result of each candidate interaction between the dragged and recipient objects may be simulated, and the simulated results may be presented as selectable previews in ranked order in an interaction preview panel. For example, the previews may be ranked based on invocation count for the candidate interactions such that the most frequently used candidate interactions are ranked higher. In some embodiments, any or all previewed results of the candidate interactions (e.g., the primary interaction preview and/or the ranked previewed results in the interaction preview panel) may be updated as the user moves the dragged object, and may be removed when the user removes the dragged object from a receipt object.

A candidate interaction may be selected for execution from a set of candidate interactions in a variety of ways. In some cases, a user may select one of the previews from an interaction preview panel. In other cases, a default or highest ranked (e.g., most frequently used or promoted) candidate interaction may be selected for execution. Upon release of the drag operation or selection of one of the candidate interactions, a selected candidate interaction may be executed to generate one or more vector object outputs, which may be saved, exported, modified, and/or reused. As such, using implementations described herein, a user can efficiently perform inter-object interactions in vector graphics.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIGS. 2A-2C illustrate an example interaction between vector objects and an example interaction preview panel, in accordance with certain embodiments;

DETAILED DESCRIPTION

Overview

Figure 1:
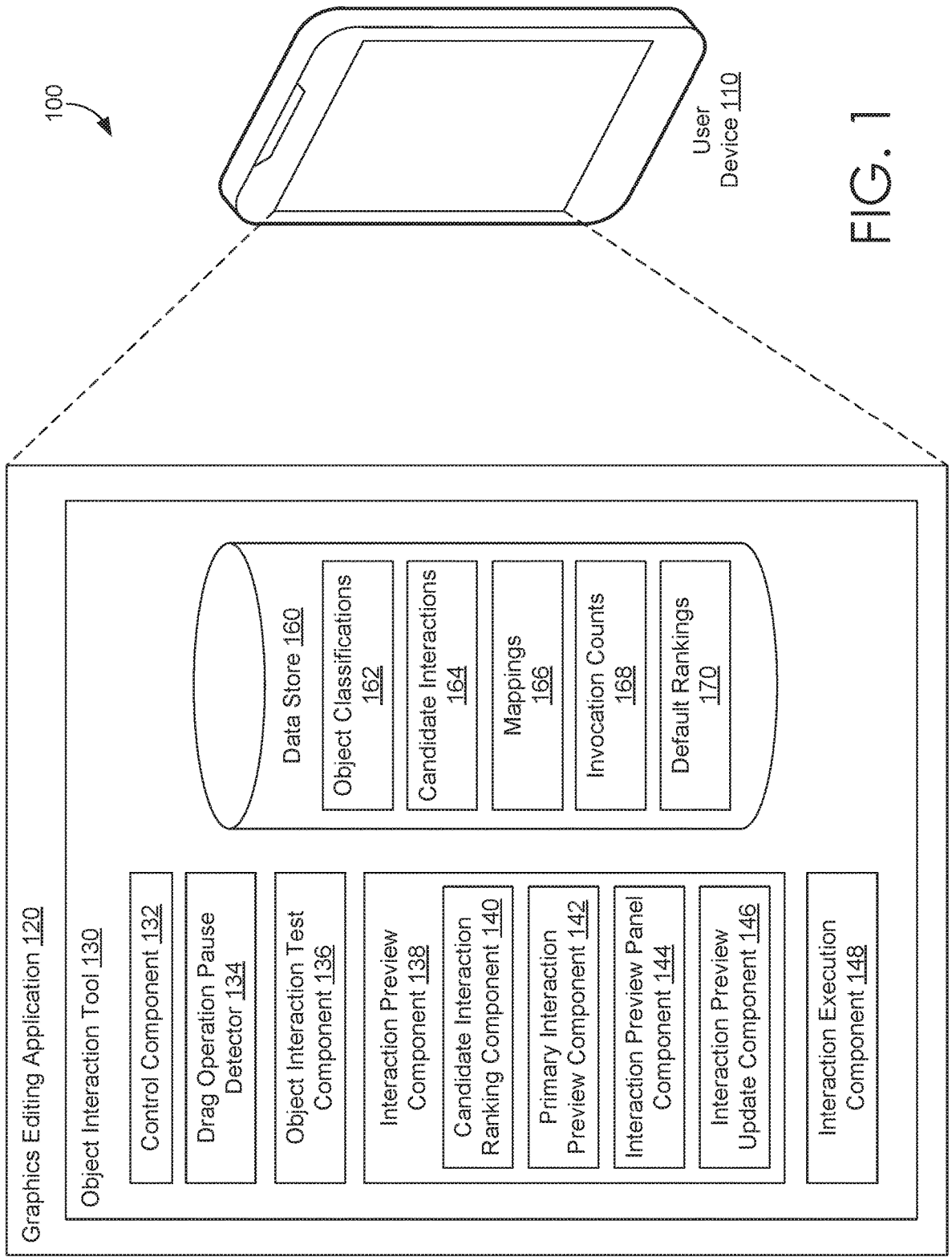
FIG. 1 is a block diagram of an example vector graphics environment, in accordance with certain embodiments.

Vector graphics editing tools allow designers and illustrators to build vector objects and vector artwork that can be scaled to any size. Conventionally, vector objects and vector artwork are created incrementally. For example, designers often begin with small constituent objects (e.g., paths, other vector objects, etc.), and combine them in various ways to build more complicated vector objects and vector artwork. Vector graphics editing tools often evolve over time, adding new or modified functionality for vector graphics editing.

However, conventional vector graphics editing tools suffer from various drawbacks. For example, some conventional vector graphics editing tools provide functionality that is hard to discover or use. As software capabilities advance and provide more and more functionality, it is often challenging for users to discover the existence of these new functions and how to use them. In fact, discoverability of functionality is often one of the reasons designers select a particular software product. As such, there is a need for improved ease of discoverability in conventional vector graphics editing tools. Moreover, new and modified functionality often comes with an associated learning curve, especially when it takes a number of steps to achieve a desired outcome. For example, some vector graphics editing operations like those involved in creating geometric patterns can be challenging or repetitive. More generally, many conventional vector graphics editing operations are tedious and time consuming, resulting in an unsatisfactory process. Furthermore, in some scenarios such as on mobile devices, screen space is limited. As such, software designers for conventional vector graphics editing tools often cannot provide the same amount of menus in these scenarios as they can when screen space is not so limited, such as with desktop products. For these and other reasons, there is a need for improved vector graphics editing tools.

Accordingly, embodiments of the present invention are directed to techniques for performing inter-object interactions between vector objects, and more specifically, adjusting the appearance of one vector object based on another vector object. For example, a vector object interaction framework may be implemented in which designers drag a vector object onto another vector object to trigger an interaction between the objects. Candidate interactions between pairs of object types may be pre-defined and stored in a suitable data structure(s). Thus, when one vector object is dragged onto a recipient vector object and a pause is detected, the object types for the dragged and recipient objects may be determined, and a corresponding set of candidate interactions for the pair of object types may be accessed, ranked, simulated, and/or presented as selectable previews. As such, one of the candidate interactions may be selected and executed to form one or more output vector objects that may be saved, exported, modified, and/or reused.

Candidate interactions for a pair of dragged and recipient vector objects may be identified based on object types (e.g., classifications) for the pair of vector objects. For example, a vector object may be classified into one of a set of supported classifications. Supported classifications may include a classification for primitive vector objects (primitive vector object-type) or classifications thereof, such as path-type vector objects (e.g., lines, polylines, polygons, Bezier curves, bezigons, circles, ellipses, etc.), text-type vector objects (e.g., where each letter is created from Bezier curves), image-type vector objects (e.g., a bitmap behaving as a rectangle or other shape), and/or others. Additionally or alternatively, supported classifications may include classifications for a group of vector objects (group-type vector objects), custom-type vector objects, and/or others. By way of non-limiting example, an example set of supported classifications for vector objects may include text-type, image-type, path-type, group-type, and custom-type. Thus, different sets of candidate interactions may be defined and stored for different combinations of object types (e.g., classifications). Example combinations may include text-type and path-type vector objects, path-type and path-type vector objects, image-type and group-type vector objects, custom-type and path-type vector objects, and custom-type and text-type vector objects to name a few possibilities. Combinations may, but need not, be dependent on directionality of interaction (e.g., whether a particular vector object is the dragged object or the recipient object).

Candidate interactions for a pair of object types may be ranked in various ways. In some embodiments, each time a candidate interaction is invoked (e.g., on a per-user basis, per-account basis, per-region basis, all-user basis), an invocation count may be incremented to track the usage of each candidate interaction. As such, candidate interactions for a pair of object types may be ranked based on invocation count. Additionally or alternatively, promoted interactions (e.g., newly designed or modified interaction, interactions that have not been used, interactions that have been minimally used, or other interactions sought to be discovered) and/or default candidate interactions may be prioritized within a ranked list candidate interactions. Default rankings for promoted and/or default interaction may be configurable (e.g., whether by software administrators, end users, or otherwise), and may be accessed and used to indicate the position in a list of candidate interactions (e.g., initially ranked by invocation count) where promoted and/or default interactions may be injected. Rankings may be updated periodically, upon detecting a corresponding change (e.g., a change in invocation count for a candidate interaction, a changed default or promoted interaction, a changed default ranking for a default interaction or promoted interaction), upon accessing a list of candidate interactions in operation, and/or otherwise.

In operation, when a pause is detected during a drag operation, a determination may be made whether a dragged object satisfies an interaction metric with a recipient object (e.g., the objects overlap or fall within a threshold distance of one another). Upon identifying a recipient object that satisfies an interaction metric while the drag operation is still pending, a preview of candidate interactions corresponding to the pair of object types for the dragged and recipient objects may be presented. In some embodiments, a default or highest ranked (e.g., most frequently used or promoted) candidate interaction for the pair of object types may be previewed as a primary interaction preview. For example, the result of the default or highest ranked candidate interaction (e.g., a modification to the appearance of the dragged and/or recipient vector objects) may be simulated and temporarily displayed replacing the dragged and/or recipient vector objects. Additionally or alternatively, a ranked preview of candidate interactions for the pair of object types may be presented. For example, the result of each candidate interaction between the dragged and recipient objects may be simulated, and the simulated results may be presented as selectable previews in ranked order in an interaction preview panel. The interaction preview panel may be located on-canvas, in a vicinity of (e.g. at a predetermined or adaptable location with respect to) the current drag location, the dragged and/or recipient vector objects, and/or other elements. In some embodiments, any or all previewed results of the candidate interactions (e.g., the primary interaction preview and/or the ranked previewed results in the interaction preview panel) may be updated as the user moves the dragged object, and may be removed when the user removes the dragged object from a receipt object.

A candidate interaction may be selected for execution from a set of candidate interactions for a pair of object types in various ways. In one example, a user may select and drag a vector object (a dragged object) onto another vector object (the recipient object), pause (e.g., for a configurable amount of time), and release. Upon releasing a drag operation while the dragged and recipient objects are interacting, a default or highest ranked (e.g., most frequently used or promoted) candidate interaction may be selected and executed. In this example, by incorporating a single gesture (i.e. pause) into a normal drag operation, users can quickly perform vector object interactions and build vector artwork.

Additionally or alternatively, upon detecting a pause in a drag operation when a pair of dragged and recipient objects is selected, a preview of candidate interactions may be presented (e.g., a primary interaction preview and/or ranked previewed results in an interaction preview panel), and one of the previewed interactions may be selected by the user for execution. In one example, previews may remain operative while the drag operation is pending (and/or while the dragged and recipient objects are interacting), and the user may select a preview from the interaction preview panel with a second input (e.g., another finger or stylus) while dragging. Such a selection may cause execution of the selected candidate interaction, replacement of the primary interaction preview with the selected candidate interaction, and/or may simply serve as an indication that the selected candidate interaction should be executed upon subsequent release of the drag operation (e.g., as long as the dragged and receipt objects remain selected, or are selected at the time the drag operation is released).

In yet another example in which a candidate interaction may be selected for execution, after a drag operation is released, previously presented previews may remain operative for a defined duration of time until the user selects one of the previews with a subsequent input, until the user enters some other subsequent input (e.g., elsewhere on the canvas), and/or otherwise. In some cases where the previews remain operative after a drag operation is released, none of the candidate interactions has initially been selected, so the user may select one (e.g., from the interaction preview panel) for execution. In other cases where the previews remain operative after a drag operation is released, one of the candidate interactions may have been previously selected (or may be selected upon release of the drag operation). In this case, the initially selected candidate interaction may temporarily replace the dragged and recipient objects on the canvas (e.g., until confirmed or replaced with an alternate candidate interaction). In some embodiments, the user may replace an initially selected candidate interaction with one or more subsequently selected candidate interactions (e.g., from the interaction preview panel) for execution. In some cases, the interaction preview panel may close upon selection of a candidate interaction from the panel. In any case, the interaction preview panel may remain open after a drag operation is released and/or after a selection has been made from the panel until some other event is detected (e.g., a defined duration of time, until the user selects one of the previews for execution or enters some subsequent input such as an interaction elsewhere on the canvas, and/or otherwise). These are just a few examples of how a candidate interaction may be selected for execution.

Upon executing a selected candidate interaction between a pair of dragged and recipient vector objects, any of a variety of outputs may be generated. In some cases, the interacted objects may be grouped, but remain separate. In some cases, the interacted objects may be merged into a new composite object. In yet another example, a third object that merges the dragged and recipient object may be generated, and the original dragged and recipient objects may be maintained. In some scenarios, an executed interaction may be parameterized and subsequently revised. Taking an example text-to-path interaction, an initial implementation may place the starting point of the text at the location where the drag operation was released (e.g., where the finger lifted), and the location of the starting point of the text may be subsequently revised. In another example text-to-path interaction creating a strikethrough of text based on path geometry, a corresponding format may be applied as a property of the text so the strikethrough would continue through subsequently added characters. The type of output generated by executing a selected candidate interaction may be configurable or pre-determined. Additionally or alternatively, different types of outputs may be reflected as different candidate interactions (e.g., which may be separately previewed). In any event, generated output vector objects may be saved, exported, modified, and/or reused.

As such, using implementations described herein, a user can efficiently perform inter-object interactions in vector graphics. By making candidate interactions available by dragging and dropping vector objects onto one another, a variety of candidate interactions may be made accessible through on-canvas operations. That is, users no longer need to engage in menus or other off-canvas interaction elements that can distract and interrupt the workflow. Thus, the on-canvas inter-object interaction framework described herein makes object interaction functionality easier to access and makes vector graphics editing more efficient. Furthermore, by arranging the eligible candidate interactions for a pair of interacting vector objects and/or presenting the eligible candidate interactions as a preview, the present inter-object interaction framework improves the ease of discoverability of the eligible candidate interactions over prior techniques. In these examples, rather than navigating and exploring menus and interaction elements, a simple on-canvas gesture curates and presents the eligible candidate interactions, making the user experience more efficient. Moreover, by curating and presenting the eligible candidate interactions on-canvas, limited screen space is used more efficiently as there is no need to navigate or explore menus or interaction elements for functionality that is not relevant to the interacting objects. These and other benefits will be apparent to those of skill in the art.

Having briefly described an overview of aspects of the present invention, various terms used throughout this description are provided. Although more details regarding various terms are provided throughout this description, general descriptions of some terms are included below to provider a clearer understanding of the ideas disclosed herein:

Vector graphics (also called vector objects or vector images) are images made up of vectors that define lines and curves. For example, a vector object may be defined by a set of two-dimensional points and a set of paths such as lines or curves connecting the points. A vector object may have a defined set of properties such as stroke thickness, color, shape, curve, fill, or opacity, to name a few examples. Unlike raster graphics, which are composed with pixels, vector graphics can be defined mathematically, so they can be scaled to any size without loss of quality. This resolution independence makes vector graphics adaptable to many applications, including logos, clothing, product packaging, signs, and billboards. Generally, a vector object may be classified into one of a set of supported classifications. By way of non-limiting example, an example set of supported classifications for vector objects may include text-type, image-type, path-type, group-type, and custom-type.

A path-type vector object is a vector object that includes one or more paths that may form any number of lines, polylines, polygons, Bezier curves, bezigons, circles, ellipses, and/or the like.

A text-type vector object is a vector object that includes one or more text symbols or characters, such as letters, formed by one or more paths. For example, each letter may be created from Bezier curves.

An image-type vector object is an image that is treated as a vector object, such as a path-type vector object. For example, if the image has a boundary forming a particular shape such as a rectangular, the boundary of the image may be treated as a path-type vector object with a fill defined by the image. Generally, any type of image may be treated as a vector object, including raster formats (e.g., JPEG, TIFF, GIF, BMP, PNG), container formats (e.g., AFPhoto, CPT, PSD, PSP), compound formats (e.g., PDF, EPS, WMF, EMF, SWF), and others. By way of nonlimiting example, a rectangular bitmap image may be treated as a path-type vector object, thereby behaving like a rectangular vector object.

A group-type vector object is a set of vector objects that are grouped together and treated collectively. In some case, a group-type vector object may behave like a single composite vector object that includes each of the constituent vector objects in the group, although the constituent vector objects remain separate entities. For example, a property applied to the group may be applied to each of the objects in the group.

A custom-type vector object is a type of classification for supported elements that are not vector objects. For example, in some embodiments, other types of elements besides vector objects may be eligible for a supported inter-object interaction. For example, some menu items, widgets, and/or other interaction elements control functionality that can be applied to a vector object (e.g., setting or property or changing an appearance of a vector object, or otherwise modifying a vector object). To support these types of functions in an inter-object interaction framework, a dragged interaction element may be encapsulated into a custom vector object. For example, a shell vector object may be created or otherwise accessed, and the dragged interaction element may be imported into the shell vector object. This may allow the interaction element to be treated like a vector object, capable of being dragged and dropped onto a recipient vector object to perform an interaction with the recipient vector object. A separate custom-type classification may be defined (e.g., by design, by software administrators, by end users, or otherwise) for a particular custom vector object, a category or group of custom vector objects, or otherwise. In some cases, a custom-type classification may be defined for a custom vector object that groups vector objects with different object types. These and other types of custom vector objects and custom-type classifications may be implemented within the scope of the present disclosure.

Example Vector Object Interaction Environment

Referring now to FIG. 1, a block diagram of example vector graphics environment 100 suitable for use in implementing embodiments of the invention is shown. Generally, vector graphics environment 100 is suitable for performing inter-object interactions between vector objects, and, among other things, facilitates adjusting the appearance of one vector object based on another vector object. Vector graphics environment 100 includes a user device 110. User device 110 may be any kind of computing device capable of facilitating inter-object interactions between vector objects. For example, in an embodiment, user device 110 can be a computing device such as computing device 1000, as described below with reference to FIG. 10. In embodiments, user device 110 can be a mobile computing device, a PDA, a cell phone, a personal computer (PC), a laptop computer, a workstation, or the like. User device 110 may be in communication with one or more computing devices such as a server (not shown in FIG. 1) through a network, which may include, without limitation, one or more local area networks (LANs) and/or wide area networks (WANs). Such networking environments are commonplace in offices, enterprise-wide computer networks, intranets, and the Internet.

As illustrated in FIG. 1, user device 110 includes graphics editing application 120. Generally, graphics editing application 120 facilitates graphics editing and/or illustration. One example application that may be used for vector graphics editing and illustration on a mobile device is ADOBE ILLUSTRATOR® DRAW. An example application that may be used for vector graphics editing and illustration on a desktop device is ADOBE ILLUSTRATOR. In the example illustrated in FIG. 1, graphics editing application 120 includes object interaction tool 130. Generally, object interaction tool 130 facilitates performing inter-object interactions between vector objects. Object interaction tool 130 may be incorporated, or integrated, into an application or an add-on or plug-in to an application, such as graphics editing application 120. Generally, object interaction tool 130 and/or its associated application may be a stand-alone application, a mobile application, a web application, or the like. In some implementations, object interaction tool 130 and/or its associated application may include a web application, which can run in a web browser, and could be hosted at least partially server-side. Additionally or alternatively, object interaction tool 130 and/or its associated application may include a dedicated application. In some cases, object interaction tool 130 and/or its associated application may be integrated into an operating system (e.g., as a service). Although object interaction tool 130 is generally discussed herein as being associated with an application, in some cases, object interaction tool 130, or some portion thereof, may additionally or alternatively be integrated into an operating system (e.g., as a service) or a server (e.g., a remote server).

To facilitate inter-object interactions between vector objects, in some embodiments, candidate interactions between pairs of object types may be pre-defined and stored in a suitable data structure(s). For example, and with respect to FIG. 1, a set of supported object classifications 162, candidate interactions 164, and/or mappings 166 may be stored in one or more accessible data stores (e.g. data store 160). Generally, a vector object may be classified into one of a set of supported classifications 162. Supported classifications 162 may include classification for primitive vector objects (primitive vector object-type) or classifications thereof, such as path-type vector objects (e.g., lines, polylines, polygons, Bezier curves, bezigons, circles, ellipses, etc.), text-type vector objects (e.g., where each letter is created from Bezier curves), image-type vector objects (e.g., a bitmap behaving as a rectangle or other shape), and/or others. Additionally or alternatively, supported object classifications 162 may include classifications for a group of vector objects (group-type vector objects), a particular type or combination of custom-type vector objects, and/or others. By way of non-limiting example, an example set of supported object classifications 162 for vector objects may include text-type, image-type, path-type, group-type, and custom-type.

In some embodiments, different sets of candidate interactions 164 may be defined and stored for different combinations of supported object classifications 162. Example combinations may include text-type and path-type vector objects (text-path interactions), path-type and path-type vector objects (path-path interactions), image-type and group-type vector objects (image-group interactions), custom-type and path-type vector objects (custom-path interactions), and custom-type and text-type vector objects (custom-text interactions), to name a few possibilities. Combinations may, but need not, be dependent on directionality of interaction (e.g., whether a particular vector object is the dragged object or the recipient object). For any number of combinations of object classifications 162, the combination may be mapped to a corresponding set of candidate interactions 164. In the embodiment illustrated in FIG. 1, this association between a combination of object classifications 162 and a corresponding set of candidate interactions 164 is reflected via mappings 166. Generally, any suitable data structure(s) may be used to store (indications or identifiers for) candidate interactions for each pair of supported object classifications. For example, candidate interactions for each pair of supported object classifications may be stored in a table, map, hash, sorted list, and/or any structure that allows searching between or otherwise associating two categories of object.

In some embodiment, invocation counts 168 for each of candidate interactions 164 may be tracked. Invocation counts 168 may be personalized and tracked on a per-user basis, per-account basis, per-region basis, all-user basis, or otherwise. Usage of each candidate interaction 164 may be tracked in various ways. For example, each time a tracked candidate interaction 164 is invoked (e.g., by a particular user, a particular account, a particular group, by any user, etc.), an invocation count 168 may be incremented for the candidate interaction 164. The invocation count 168 may be stored in association with the list of tracked candidate interactions 164 (e.g., stored or associated with the data structure(s) storing the candidate interactions 164). In a simple implementation example, mappings 166 between tracked candidate interactions 164 and invocation counts 168 may be maintained. In operation, invoked interactions may be enqueued to a task queue and monitored for any of the tracked candidate interactions 164. Upon determining that one of the tracked candidate interactions 164 has been enqueued (or executed), mappings 166 may be used to access and increment the invocation count 168 for the tracked candidate interaction 164. Generally, tracked candidate interactions 164 and/or corresponding invocation counts 168 may be stored any suitable data structure(s), such as tables, maps, hashes, sorted lists, and/or any structure that allows searching between or otherwise associating candidate interactions and invocation counts. As explained in more detail below, tracked invocation counts 168 may be used to rank candidate interactions 164 and influence their ordering in interaction previews.

In operation, object interaction tool 130 allows a user to select a pair vector objects and perform an inter-object interaction between the two objects. In the embodiment illustrated in FIG. 1, object interaction tool 130 includes control component 132, drag operation pause detector 134, object interaction test component 136, interaction preview component 138, interaction execution component 148, and data store 160. Although the components of object interaction tool 130 are illustrated in FIG. 1 as part of graphics editing application 120, this need not be the case. Any or all the components of object interaction tool 130 may reside elsewhere, whether on mobile device 110 or some other device (e.g., a remote server, a remote data store, or otherwise).

At a high level, control component 132 may detect, monitor, and coordinate execution of interactions between vector objects. Generally, control component 132 may operate a control loop to perform various actions while a detected drag operation of a dragged vector object is active. Upon detecting release of the drag operation without a recipient object, control component 132 may break and exit the control loop. Generally, control component 132 may detect a drag operation in which a vector object is dragged onto another vector object. During a detected drag operation, control component 132 may detect a pause for a threshold amount of time (e.g., by triggering drag operation pause detector 134). The pause may be treated as a gesture indicating an intention that a dragged object and a recipient object should interact. Thus, upon detecting a pause in the drag operation, control component 132 may determine whether a dragged object satisfies an interaction metric with a recipient object (e.g., by triggering object interaction test component 136). Upon identifying a recipient object while the drag operation is still pending, control component 132 may cause a presentation of one or more interaction previews for a set of candidate interactions corresponding to the dragged and recipient objects (e.g., by triggering interaction preview component 138). Upon detecting release of the drag operation with a recipient object present, control component 132 may execute one of the candidate interactions between the dragged and recipient objects (e.g., by triggering interaction execution component 148).

More specifically, control component 132 may detect a drag operation performed on a vector object or other eligible interaction element. For example, control component 132 may detect a click and drag event (or some other type of drag operation such as a tap, hold, and drag event) and/or may identify a particular vector object or other eligible element being dragged (a dragged object). In some cases, control component 132 may perform such a detection using an API such as a drag and drop API or some other interface with an input/output (I/O) component (e.g., an I/O component of user device 110, one of I/O components 1020 of computing device 1000 of FIG. 10, or otherwise). In some embodiments, upon detecting a drag operation (e.g., on a graphics editing canvas), control component 132 may identify a dragged object (e.g., based on the screen location of an I/O event such as a click or tap intersecting or otherwise interacting with a vector object or other interaction element).

Upon identifying a dragged object, control component 132 may determine whether the dragged object is eligible for a supported interaction. For example, vectors objects may be deemed eligible, so control component 132 may identify the dragged object as a vector object and deem the dragged object eligible. In some embodiments, other types of elements besides vector objects may be eligible for a supported interaction. For example, some menu items, widgets, and/or other interaction elements control functionality that can be applied to a vector object (e.g., setting or changing an appearance or property of a vector object). Interaction elements such as these may be eligible for a supported interaction. A list or other identification of supported interaction elements may be stored (e.g., in an accessible data store such as data store 160). As such, when the dragged object is an interaction element, control component 132 may access the list and determine whether the dragged interaction element is one of the supported interaction elements. If so, control component 132 may deem the dragged interaction element eligible and continue the process.

In order to support dragged interaction elements in an inter-object interaction framework, in some embodiments, the dragged interaction element may be encapsulated into a custom vector object. For example, a shell vector object may be created or otherwise accessed, and the dragged interaction element may be imported into the shell vector object. In some embodiments, a shell vector object may be defined with a border and fill illustrating the interaction element (e.g., using an image such as an icon, representative text, or a snapshot of the interaction element from a graphical user interface). The shell vector object may include or be associated with code that triggers the functionality of the encapsulated interaction element (e.g., by calling the functionality and passing a recipient vector object as an argument). For example, upon (e.g., control component 132) detecting a dragged interaction element being dropped on a recipient vector object, control component 132 and/or interaction execution component 148 may cause the functionality associated with interaction element to be applied on the recipient vector object (e.g., by changing a corresponding property of the recipient vector object). As such, a variety of eligible interaction elements may be encapsulated into a custom vector object that allows an eligible interaction element to be dragged and dropped.

Whether a dragged object is an on-canvas vector object or an eligible interaction element encapsulated into a custom vector object, control component 132 may detect a drag operation performed on an eligible dragged object. While the drag operation is active (e.g., before releasing the drag, thereby dropping the dragged object), control component 132 may operate a control loop to perform various actions to detect inter-object interactions between vector objects. Upon detecting release of the drag operation without a recipient object present, control component 132 may break and exit the control loop. In that scenario, control component 132 (or some other component) may move a dragged vector object to another on-canvas location where it was dropped. In the alternative, control component 132 may detect a drag operation in which a dragged object is dragged onto a recipient vector object. Upon detecting release of the drag operation with a recipient object present, control component 132 may execute one of a plurality of candidate interactions between the dragged and recipient objects, as explained in more detail below.

Generally, a pause during a drag operation may be treated as a gesture indicating an intention that a dragged object and a recipient object should interact. As such, during a detected drag operation, control component 132 may detect a pause for a threshold amount of time (e.g., by triggering drag operation pause detector 134). The threshold pause duration may be predetermined, configurable (e.g., by software administrators or end users), or otherwise. By way of nonlimiting example, the threshold pause duration may be 250 ms, although the threshold may be set to any desired duration. In some embodiments, upon invocation during a detected drag operation, drag operation pause detector 134 may access and evaluate input data from an I/O component (e.g., an I/O component of user device 110, one of I/O components 1020 of computing device 1000 of FIG. 10, or otherwise), and evaluate the input data for a pause. For example, the input data may include screen location coordinates and/or velocity. In some embodiments, when velocity of zero (or within some threshold of zero) is detected, a timer may be started and the current location may be recorded. While the timer elapses, input data may be repetitively, periodically, and/or continuously accessed and evaluated. For example, input velocity may be monitored for a spike above some threshold indicating the drag operation is continuing. Additionally or alternatively, input location may be monitored for movement beyond some threshold distance indicating the drag operation is continuing. For example, input location may be monitored to detect a distance from the initial location when the timer began, movement over some duration of time such as during the most recent interval corresponding to the threshold pause duration (e.g., t-threshold pause duration), or otherwise. If the timer elapses for the threshold pause duration without velocity and/or input location exceeding corresponding thresholds, drag operation pause detector 134 may identify a pause as having occurred.

Upon detecting a pause in the drag operation, control component 132 may determine whether a dragged object satisfies an interaction metric with a recipient object (e.g., by triggering object interaction test component 136). By waiting to detect a recipient object until detecting a pause in a drag operation, object interaction testing may be made more efficient by avoiding unnecessary testing at intermediate drag locations. Generally, object interaction test component 136 may identify a recipient object by determining whether a dragged object satisfies an interaction metric with a recipient object. For example, object interaction test component 136 may evaluate whether an input location (e.g., at the time of the pause, at a current time or otherwise) is overlapping with, or within some threshold distance of, a recipient vector object (recipient object). Additionally or alternatively, object interaction test component 136 may evaluate whether a dragged object is overlapping with, or within some threshold distance of, a recipient vector object. These and other interaction metrics may be implemented within the scope of the present disclosure.

In some embodiments (e.g., upon detecting a pause in a drag operation), object interaction test component 136 may identify other vector objects on the canvas (besides the dragged object) as candidate recipient objects. For each candidate recipient object, object interaction test component 136 may evaluate whether the dragged object and candidate recipient objects satisfy an interaction metric (e.g., overlap, located within a threshold distance of one another). In some embodiments, object interaction test component 136 may use a test API that determines (e.g., during rendering) whether vector objects intersect and/or identifies one of a plurality of candidate recipient objects as a recipient object. If there are multiple candidate recipient objects that satisfy an interaction metric, one of the candidate recipient objects may be selected in various ways. In a simple example, the front-most candidate recipient object (e.g., in z-order) may be selected as the recipient object. These and other ways to identify a recipient object are contemplated within the scope of the present disclosure. In some embodiments, when a recipient object is identified, some corresponding indication may be presented. For example, a selection box originally surrounding a dragged object may be updated, upon identifying a recipient object, so the updated selection box surrounds both the dragged and recipient objects. In another example, the recipient object may be indicated some other way, whether through emphasis, labeling, or otherwise.

Upon identifying a recipient object while the drag operation is still pending, control component 132 may cause a presentation of one or more interaction previews for a set of candidate interactions 164 corresponding to the dragged and recipient objects (e.g., by triggering interaction preview component 138). For example, interaction preview component 138 classify the dragged and recipient objects into a pair of object classifications 162, and access a set of candidate interactions 164 (e.g., via mappings 166) associated with the pair of object classifications 162. As such, interaction preview component 138 may cause presentation of one or more previews of the candidate interactions 164 corresponding to the dragged and recipient objects. In the embodiment illustrated in FIG. 1, interaction preview component 138 includes candidate interaction ranking component 140, primary interaction preview component 142, interaction preview panel component 144, and interaction preview update component 146.

In some embodiments, candidate interaction ranking component 140 may rank the candidate interactions 164 for a pair of dragged and recipient objects. For example, candidate interaction ranking component 140 may rank candidate interactions by invocation count 168. That is, candidate interaction ranking component 140 may access invocation counts 168 (e.g., via mappings 166) and rank the candidate interaction in order of highest invocation count. As such, the most frequently used candidate interactions for a pair of dragged and recipient objects may be ranked highest. Additionally or alternatively, promoted interactions (e.g., newly designed or modified interaction, interactions that have not been used, interactions that have been minimally used, or other interactions sought to be discovered) and/or default candidate interactions may be prioritized within a ranked list candidate interactions. For example, default rankings 170 may be stored in an accessible data store (e.g., data store 160), and may be configurable, whether by software administrators, end users, or otherwise. Default rankings 170 for promoted and/or default interactions may be accessed and used to indicate the position in a list of candidate interactions (e.g., initially ranked by invocation count) where promoted and/or default interactions may be injected. In one example, candidate interactions that have been set as a default may be ranked first, promoted candidate interactions may be ranked second, and so on. Generally, rankings may be updated periodically, upon detecting a corresponding change (e.g., a change in invocation count 168 for a candidate interaction, a changed default or promoted interaction, a changed default ranking 170 for a default interaction or promoted interaction), upon accessing a list of candidate interactions 164 in operation, and/or otherwise. As such, candidate interaction ranking component 140 may create, access, and/or update a ranked list of candidate interactions 164 for a pair of dragged and recipient objects.

In some embodiments, primary interaction preview component 142 may cause presentation of a primary preview for a default or highest ranked (e.g., most frequently used or promoted) candidate interaction for a pair of dragged and recipient objects. For example, the result of the default or highest ranked candidate interaction (e.g., a modification to the appearance of the dragged and/or recipient vector objects) may be simulated and temporarily displayed replacing the dragged and/or recipient vector objects.

Additionally or alternatively, interaction preview panel component 144 may cause presentation of a ranked preview of candidate interactions 164 for the pair of dragged and recipient objects. For example, interaction preview panel component 144 may simulate the result of each candidate interaction 164 between the dragged and recipient vector objects (or a designated number of candidate interaction 164 to save memory and/or screen space), and simulated results may be displayed (e.g., in ranked order) as selectable previews in an interaction preview panel. The interaction preview panel may be located on-canvas, in a vicinity of (e.g. at a predetermined or adaptable location with respect to) the current drag location, the dragged and/or recipient vector objects, and/or other elements. In some embodiments, any or all previewed results for the candidate interactions 164 (e.g., the primary interaction preview and/or the ranked previewed results in the interaction preview panel) may be updated if the drag operation continues. For example, interaction preview update component 146 may update the previews as the user moves the dragged object (e.g., by accessing updated locations for the dragged object, re-simulating the previews, and updated previews). In some embodiments, interaction preview update component 146 may detect when a dragged object is moved off a recipient object (e.g., an interaction metric is no longer satisfied), and based thereon, any or all previewed results for the recipient object may be removed (e.g., the interaction preview panel may be closed). As explained in more detail below, in other embodiments when a dragged object is moved off a recipient object, any or all previewed results may be retained until some other event occurs (e.g., a defined duration of time, until the user selects one of the previews for execution or enters some subsequent input such as an interaction elsewhere on the canvas, and/or otherwise).

Turning now to FIGS. 2A-2C, FIGS. 2A-2C illustrate an example interaction between vector objects 210 and 220 and an example interaction preview panel 240, in accordance with certain embodiments. In this example, a user wishes to perform an inter-object interaction between vector object 210 (a first path forming a cloud shape) and vector object 220 (a second path forming a cloud shape). In FIG. 2A, the user selects touch point 225 to select vector object 210 and begins dragging to the right until vector object 210 overlaps with vector object 220. FIG. 2B indicates the user pausing during the drag operation. For example, if a pause during a drag operation is detected and lasts for a threshold amount of time (e.g., 250 ms), vector object 220 may be identified as a recipient object, and selection box 230 and interaction preview panel 240 of FIG. 2C may be presented. More specifically, selection box 230 may be presented encompassing both vector objects 210 and 220 to indicate detection of an intent to perform an inter-object interaction between vector objects 210 and 220. In the example illustrated in interaction preview panel 240, a variety of previewed results for candidate interactions between vector objects 210 and 220 are presented). The previewed results may be selectable (e.g., by a second input such as another finger or stylus), whether while dragging or in embodiments where interaction preview panel 240 accepts a selection after the drag operation has been released.

As explained above, a set of candidate interactions for a pair of dragged and recipient objects may be based on the combination of object classifications for the pair. FIG. 2C illustrates example candidate interactions between path-type vector objects. For example interaction preview panel 240 previews candidate interactions in which vector objects 210 and 220 are united, subtracted, intersected, and excluded. Different candidate interactions may, but need not, be offered depending on directionality (e.g., a candidate subtract interaction may be inverted). The candidate interactions illustrated in FIG. 2C are meant simply as examples, and any other interaction between path-type vector objects may be ranked, previewed, and/or selected for execution. As described in more detail below with respect to FIGS. 3-6, different combinations of object classifications may produce different candidate interactions and corresponding previews.

Returning now to FIG. 1, upon detecting release of a drag operation with a recipient object present, control component 132 may execute one of the candidate interactions between the dragged and recipient objects (e.g., by triggering interaction execution component 148). For example, if one of the candidate interactions was previously selected by a user, interaction execution component 148 may execute the candidate interaction on the canvas. In some embodiments, the highest ranked (e.g., most frequently used) candidate interaction or default candidate interaction may be selected and executed. In any of these scenarios, any previously presented previews may be removed (e.g., the interaction preview panel may be closed). However, in some embodiments (e.g., if a user has not affirmatively selected one of the candidate interactions for execution), a previously presented preview may remain presented on the screen. In some embodiments where a preview has not been previously presented, upon detecting completion of the drag operation with a recipient object present, one or more previewed results may be presented (e.g., by invoking interaction preview component 138 and presenting a primary interaction preview and/or opening an interaction preview panel). Generally, an interaction preview panel that is opened (or remains open) after the release of a drag operation may remain open until some subsequent event is detected (e.g., a defined duration of time, until the user selects one of the previews for execution or enters some subsequent input such as an interaction elsewhere on the canvas, and/or otherwise). This can give the user the option of selecting one of the candidate interactions using a subsequent input entered after completing the drag operation.

In some cases where the previews remain operative after the drag operation is released, none of the candidate interactions has initially been selected, so the user may select one (e.g., from the interaction preview panel) for execution. In other cases where the previews remain operative after the drag operation is released, one of the candidate interactions may have been previously selected (or may be selected upon release of the drag operation). In this case, interaction execution component 148 may temporarily replace the dragged and recipient objects with the initially selected candidate interaction (e.g., until confirmed or replaced with an alternate candidate interaction). In some embodiments, the initially selected candidate interaction may further replace the initially selected candidate interaction with one or more subsequently selected candidate interactions (e.g., from the interaction preview panel) for execution. In some cases, the interaction preview panel may close upon selection of a candidate interaction from the panel. In any case, the interaction preview panel may remain open after a drag operation is released and/or after a selection has been made from the panel until some other event is detected (e.g., a defined duration of time, until the user selects one of the previews for execution or enters some subsequent input such as an interaction elsewhere on the canvas, and/or otherwise). These are just a few examples of how a candidate interaction may be selected for execution.

Upon executing a selected candidate interaction between a dragged and recipient vector object, interaction execution component 148 may generate any of a variety of outputs. In some cases, interaction execution component 148 may grouped the interacted objects, but the objects may remain separate. In some cases, the interacted objects may merge the interacted objects into a new composite object. In yet another example, the interacted objects may generate a third object that merges the dragged and recipient object, maintaining the original dragged and recipient objects. In some scenarios, interaction execution component 148 may parameterize an executed interaction so it may be subsequently revised. Taking an example text-to-path interaction (i.e., a text-type vector object interacting with a path-type vector object), interaction execution component 148 may initially execute an interaction that places the starting point of the text at the location where the drag operation released (e.g., where the finger lifted), create a modifiable interaction element (e.g., a draggable point) that allows the location of the starting point of the text to be subsequently revised. Generally, the type of generated output for a selected candidate interaction (e.g., grouped or merged objects) may be configurable or pre-determined. Additionally or alternatively, different types of outputs may be reflected as different candidate interactions (e.g., which may be separately previewed). In any event, generated output vector objects may be saved, exported, modified, and/or reused.

Figures 3A, 3B, 3C:
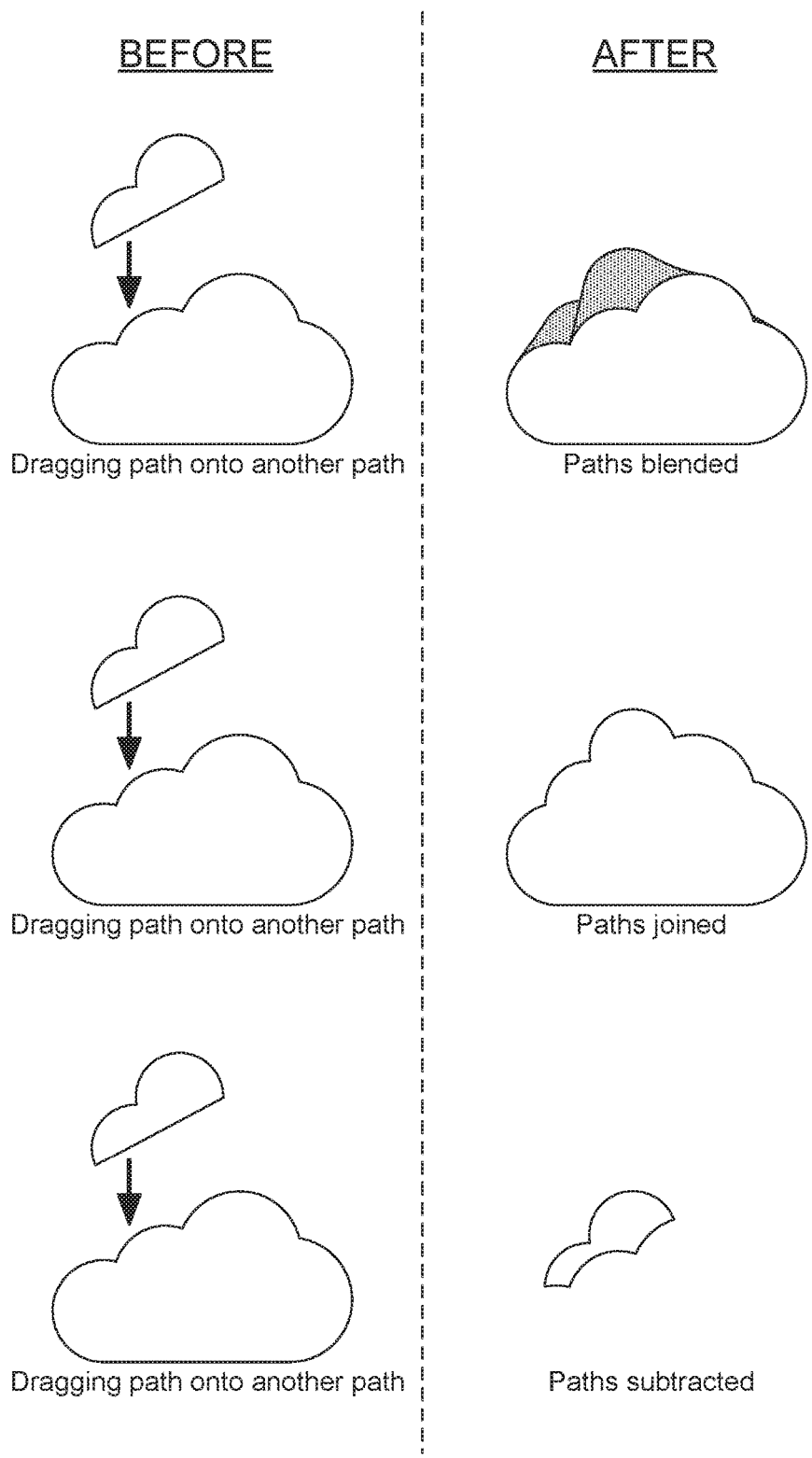
FIGS. 3A-3C illustrate example interactions between path-type and path-type vector objects, in accordance with certain embodiments.

Turning now to FIGS. 3A-3C, FIGS. 3A-3C illustrate example interactions between path-type vector objects, in accordance with certain embodiments. In FIGS. 3A-3C, the left column illustrates a scenario before an interaction is executed, and the right column illustrates different example interactions after execution. In each of FIGS. 3A-3C, the left column illustrates a dragged path (a path-type vector object) being dragged onto another path (another path-type vector object). The right column of FIG. 3A illustrates an example in which the two paths are blended. Generally, path blending may include distribution of shape and/or color. The right column of FIG. 3B illustrates an example in which the two paths are joined. The right column of FIG. 3C illustrates an example in which the two paths are subtracted. In these and other examples, different candidate interactions may, but need not, be offered depending on directionality (e.g., a subtract interaction may be inverted). The interactions illustrated in FIGS. 3A-3C are meant simply as examples, and any other interaction between path-type vector objects may be implemented.

Figure 4A:
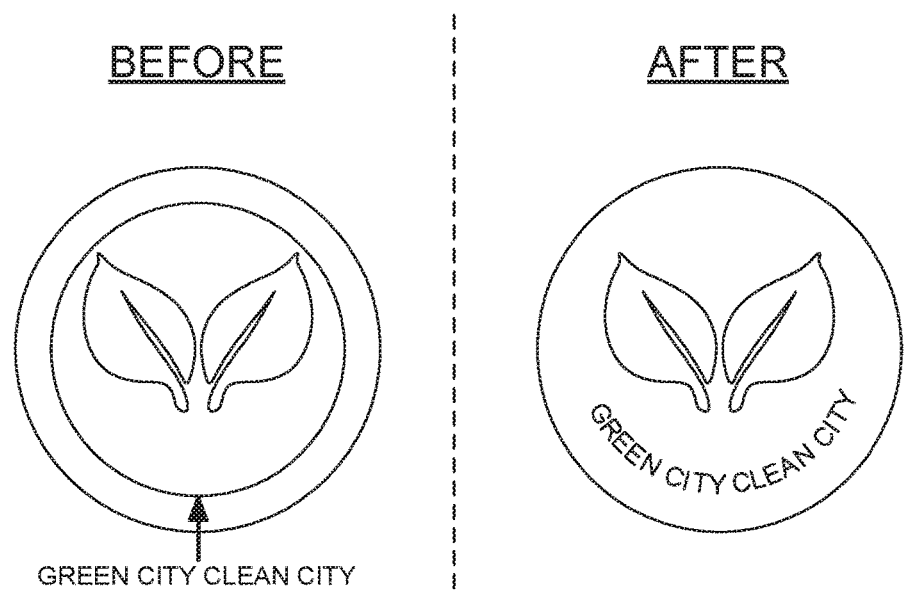
FIGS. 4A-4C illustrate example interactions between text-type and path-type vector objects, in accordance with certain embodiments.
Figure 4B:
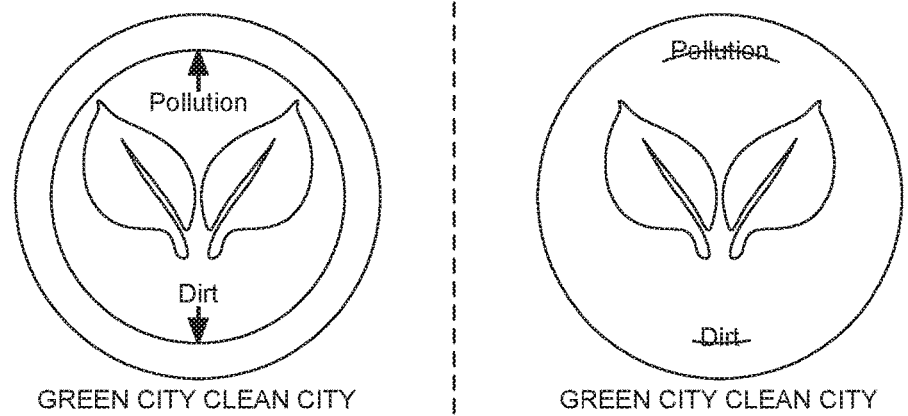
Figure 4C:
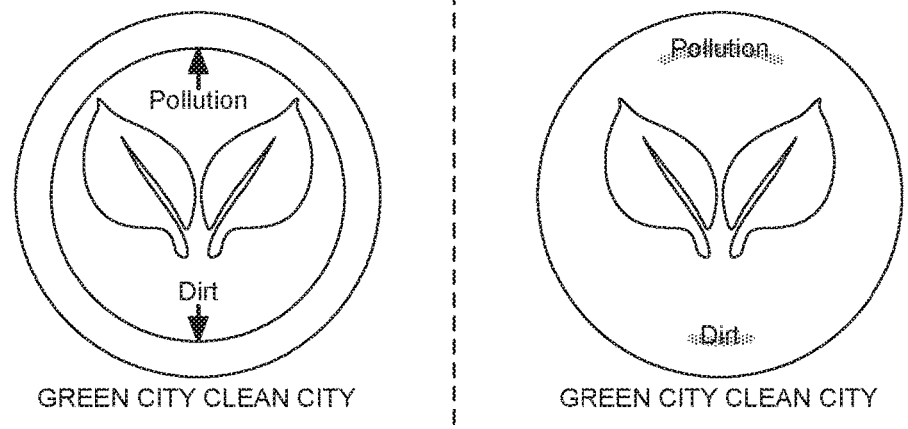

FIGS. 4A-4C illustrate example interactions between text-type and path-type vector objects, in accordance with certain embodiments. In FIGS. 4A-4C, the left column illustrates three scenarios before interactions are executed, and the right column illustrates different example interactions after execution. In each scenario for FIGS. 4A-4C, the left column illustrates one or more dragged text-type vector objects being dragged onto a path-type vector object. For example, in FIG. 4A, the left column illustrates an example in which the text "GREEN CITY CLEAN CITY" is dragged onto the inner circle of a logo. The right column of FIG. 4A illustrates an example interaction in which the inner circle is replaced with a text-on-path object, where the text is aligned with the path of the inner circle. FIG. 4B illustrates another example in which the text "Pollution" is dragged up onto the inner circle of a logo, and the text "Dirt" is dragged down onto the inner circle. The right column of FIG. 4B illustrates an example interaction in which the path of the inner circle is applied as a strike-through over the text. In this example, dragging and dropping either text-type vector object onto the inner circle may create a strike-through with the same shape as the inner circle, where the strike-through may only be visible when it intersects with a text-type vector object. In this scenario, it may not matter which text-type vector object is dragged onto the inner circle first. In yet another example, the left column of FIG. 4C illustrates an example in which the texts "Pollution" and "Dirt" are dragged onto the inner circle. The right column of FIG. 4C illustrates an example interaction in which a drop shadow that flows along the path of the inner circle is applied to the text. The interactions illustrated in FIGS. 4A-4C are meant simply as examples, and any other interaction between text-type and path-type vector objects may be implemented.

Figure 5A:
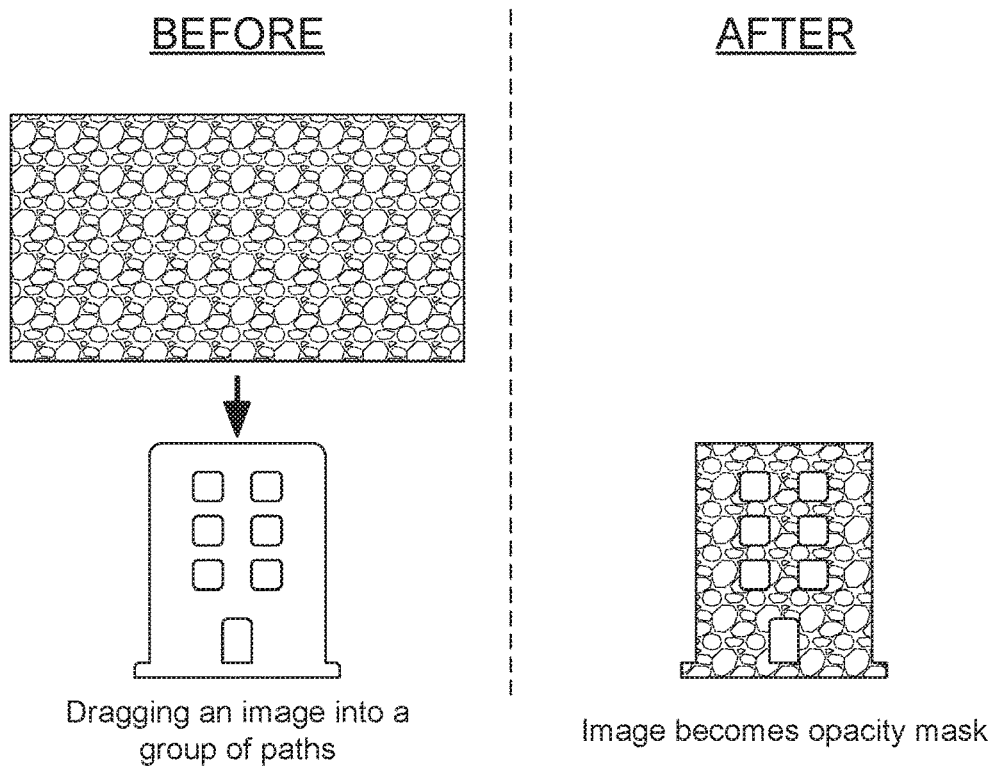
FIGS. 5A-5B illustrate example interactions between image-type and group-type vector objects, in accordance with certain embodiments.
Figure 5B:
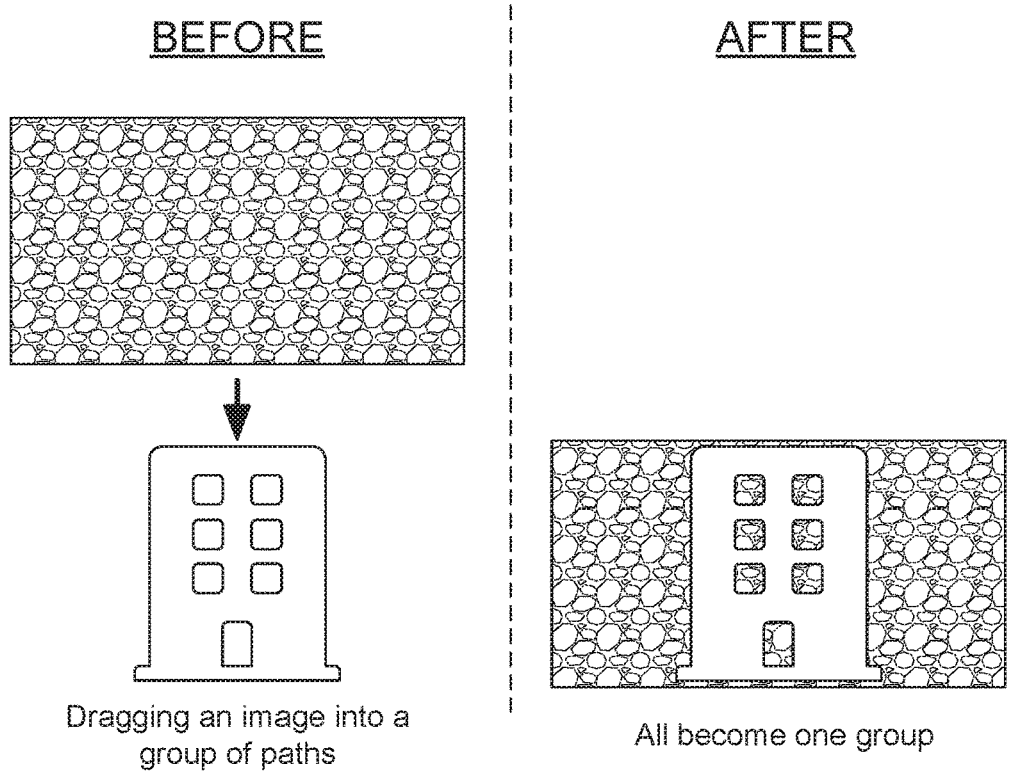

FIGS. 5A-5B illustrate example interactions between image-type and group-type vector objects, in accordance with certain embodiments. In FIGS. 5A-5B, the left column illustrates a scenario before an interaction is executed, and the right column illustrates different example interactions after execution. In each of FIGS. 5A-5B, the left column illustrates an image-type vector object being dragged on a group of path-type vector objects (a group-type vector object). In FIG. 5A, the right column illustrates an example in which dragging and dropping the image on the group produces an opacity mask over the group. In FIG. 5A, the right column illustrates an example in which dragging and dropping the image on the group makes the image become a child of the group. Other example interactions between image-type and group-type vector objects include scaling operations, creation of a clipping mask, or creation of other types of masks. These interactions are meant simply as examples, and any other interaction between image-type and group-type vector objects may be implemented.

Figure 6A:
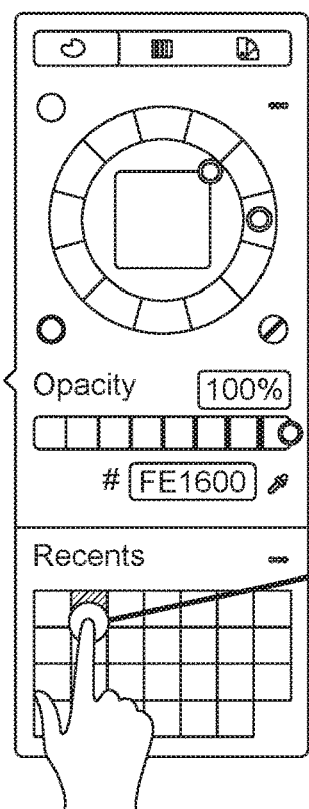
FIGS. 6A-6B illustrate example interactions between custom-type vector objects, in accordance with certain embodiments.
Figure 6A:
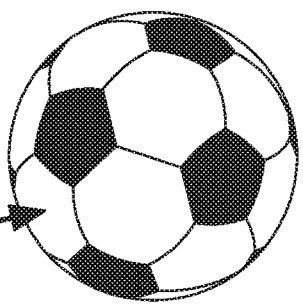
Figure 6A:
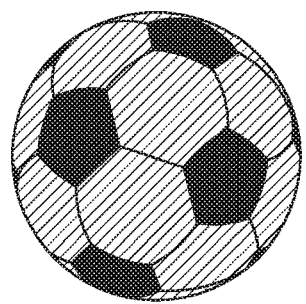
Figure 6B:
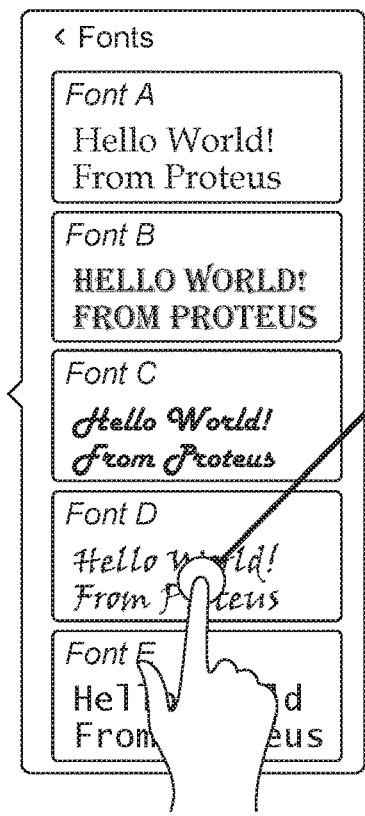

FIGS. 6A-6B illustrate example interactions with custom-type vector objects, in accordance with certain embodiments. In FIGS. 6A-6B, the left column illustrates two scenarios before an interaction is executed, and the right column illustrates different example interactions after execution. In each of FIGS. 6A-6B, the left column illustrates a custom-type vector object being dragged on a vector object. FIG. 6A illustrates an example in which a custom-type vector object is dragged on a path type object (or a group-type object). In this example, the left column illustrates an interaction element (a color from a color picker) being dragged onto a recipient object (the soccer ball). In this example, the dragged interaction element may be imported into a shell vector object so it may be dragged onto the soccer ball on-canvas. Upon release of the drag operation while the shell vector object overlaps or otherwise satisfies an interaction metric with the soccer ball, code associated with the shell vector object may apply the color to the soccer ball, as illustrated in the right column of FIG. 6A. In FIG. 6B, the left column illustrates an example in which another interaction element (e.g., a menu item that applies a particular font) is dragged onto a text-type vector object. The right column of FIG. 6B illustrates the font applied to the text-type vector object (e.g., as a property of the text-type vector object). These interactions are meant simply as examples, and any other interaction with custom-type vector objects may be implemented.

Example Flow Diagrams

Figure 7:
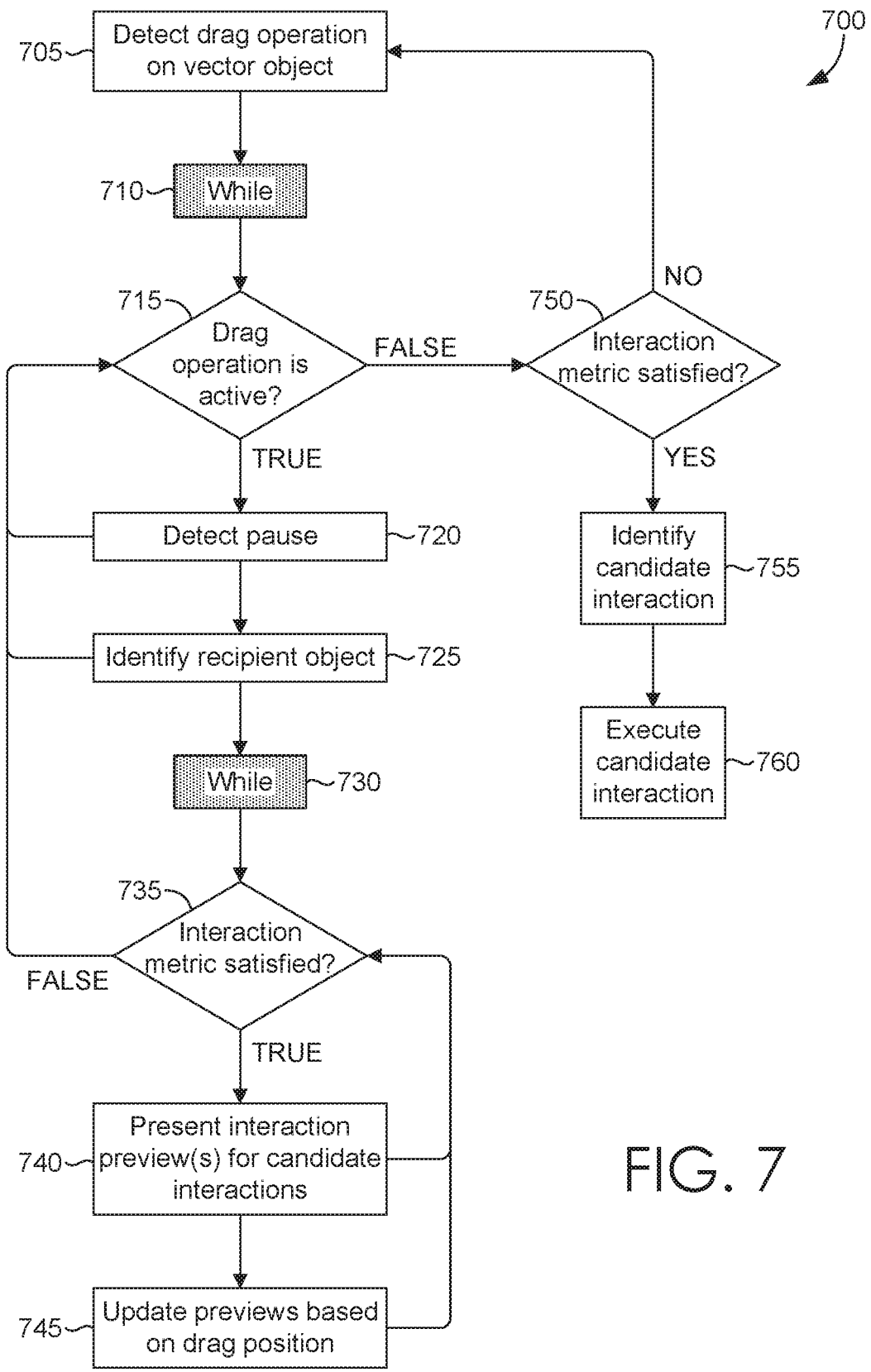
FIG. 7 is a flow diagram showing a method for performing inter-object interactions between vector objects, in accordance with certain embodiments.
Figure 8:
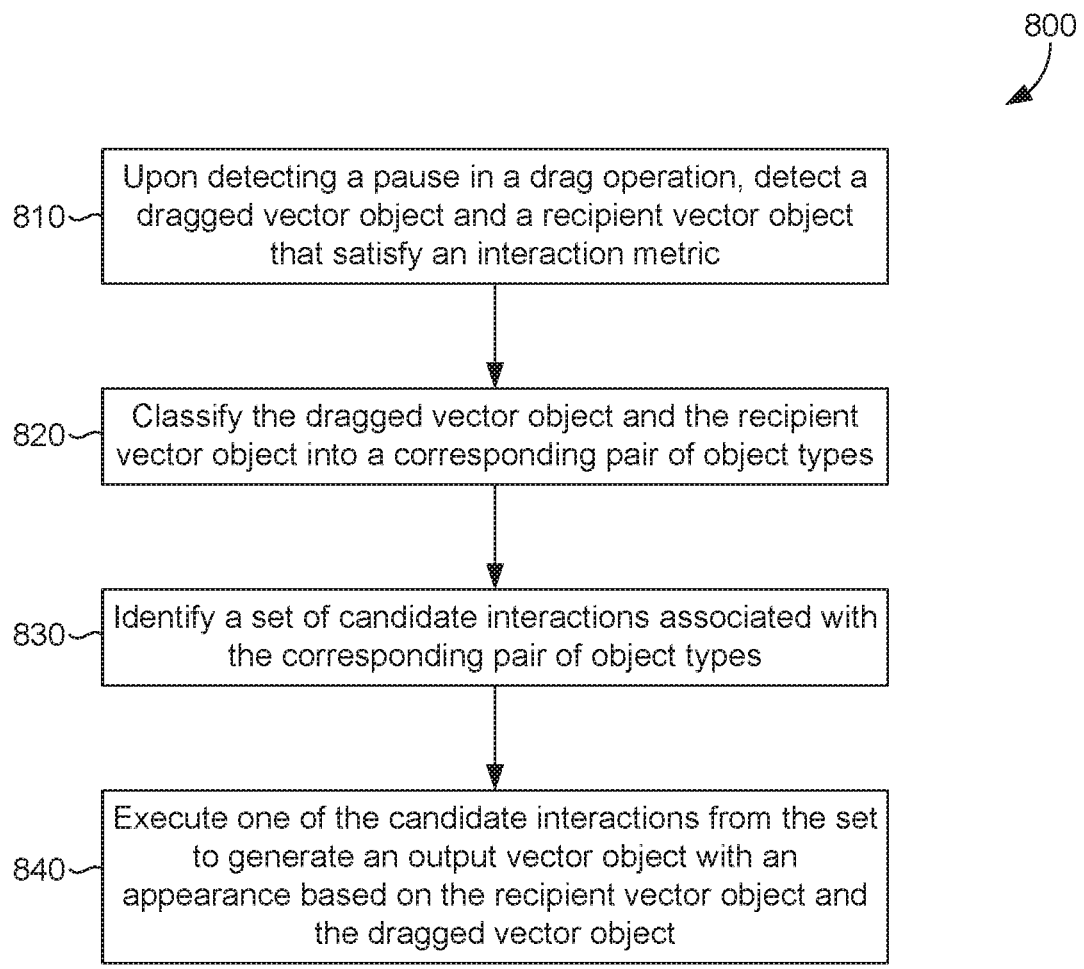
FIG. 8 is a flow diagram showing a method for vector object interaction, in accordance with certain embodiments.
Figure 9:
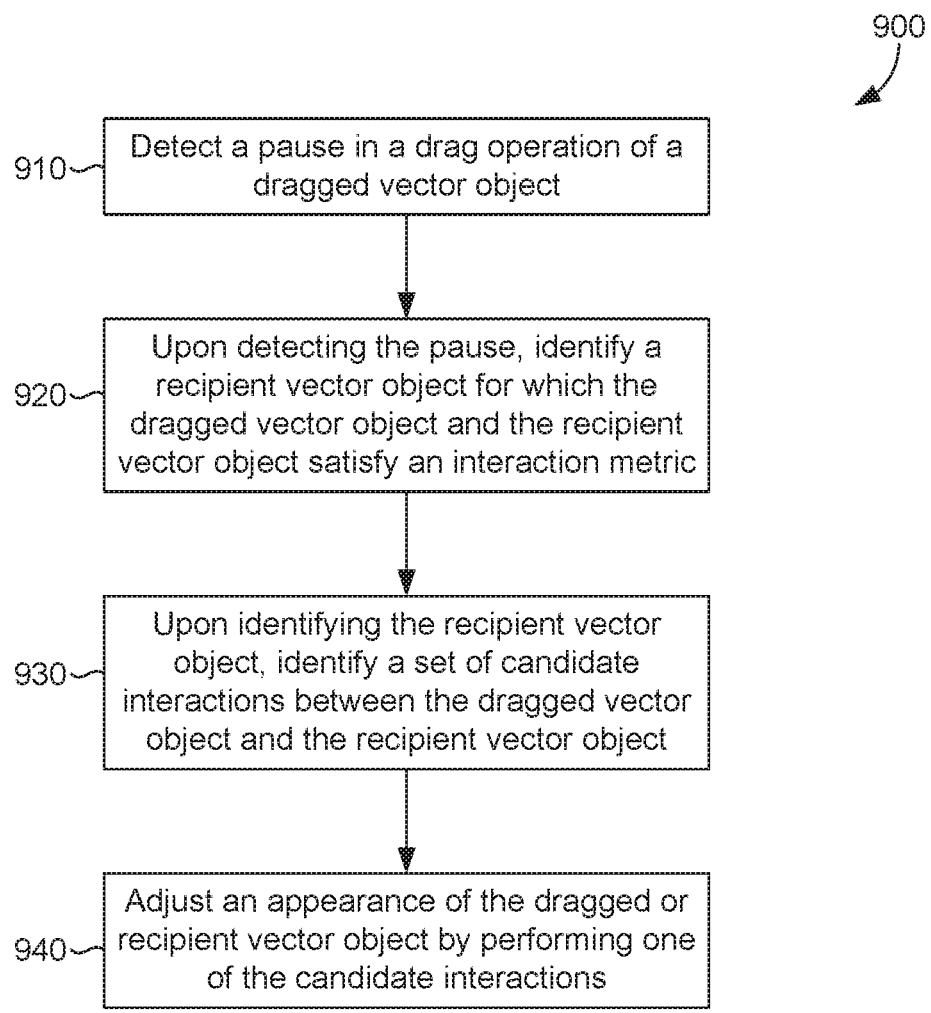
FIG. 9 is a flow diagram showing a method for vector object interaction, in accordance with certain embodiments.

With reference now to FIGS. 7-9, flow diagrams are provided illustrating methods for performing inter-object interactions between vector objects. Each block of the methods 700, 800, and 900 and any other methods described herein comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Turning initially to FIG. 7, FIG. 7 illustrates a method 700 for performing inter-object interactions between vector objects, in accordance with certain embodiments. Initially at block 705, a drag operation being performed on a vector object or other eligible interaction element is detected. At block 710, a while loop is executed while condition 715 is repetitively, periodically, and/or continuously evaluated. More specifically, the while loop 710 is executed while the drag operation is active. While condition 715 is true (the drag operation is active), at block 720, a pause in the drag operation is detected. For example, if a timer elapses for some threshold pause duration without input velocity and/or input location exceeding corresponding thresholds, a pause may be identified as having occurred. While condition 715 is true (the drag operation is active), at block 725, a recipient object is identified. For example, other vector objects on the canvas besides the dragged object may be identified as candidate recipient objects, and each candidate recipient object may be evaluated to determine an interaction metric is satisfied (e.g., the dragged and candidate recipient objects overlap or are within some threshold distance of one another). If there are multiple candidate recipient objects that satisfy an interaction metric, one of the candidate recipient objects may be selected using any suitable metric (e.g., the front-most candidate recipient object in z-order).

While condition 715 is true (the drag operation is active), at block 730, another while loop is executed while condition 735 is repetitively, periodically, and/or continuously evaluated. More specifically, the while loop 730 is executed while the dragged and recipient objects satisfy an interaction metric (e.g., they remain overlapping). While condition 735 is true (the dragged and recipient satisfy an interaction metric), at block 740, one or more interaction previews may be presented for a set of candidate interactions corresponding to the dragged and recipient objects. For example, the dragged and recipient objects may be classified into a pair of corresponding object classifications, and a set of candidate interactions for the pair of object classifications may be accessed, ranked, simulated, and presented as previews. While condition 735 is true (the dragged and recipient objects remain interacting), at block 745, the previews are updated based on drag position. Taking a simple example of two path-type vector objects and a preview of a unioning interaction, if the dragged path is moved to a different location, the previewed union can be updated to reflect the updated location of the dragged path. In some embodiments, a user may select one of the previewed candidate interactions for execution.

Returning now to while loop 710, upon detecting release of the drag operation, condition 715 becomes false, and block 750 evaluates whether a pair of dragged and recipient objects (still) satisfy an interaction metric. For example, in the event a dragged object was moved off a recipient object and then the drag operation was released, this can indicate an intent to abort any inter-object interaction. As such, in this scenario, process 700 may return to block 705 and await detection of a subsequent drag operation. On the other hand, if dragged and recipient objects (still) satisfy an interaction metric (e.g., are overlapping) when the drag operation is released, at block 755, a candidate interaction may be identified. For example, if one of the previewed candidate interactions was previously selected, the selected candidate interaction may be identified at block 755 and executed at block 760. In some embodiments, at block 755, a default or highest ranked (e.g., most frequently used or promoted interaction) may be identified at block 755 and executed at block 760. In some embodiments, upon release of the drag operation while dragged and recipient objects are interacting, an interaction preview may be presented (or a previously presented preview may remain active). In these examples, one of the previews may be selected by a user at block 755 and executed at block 760. These are just a few examples, and other ways to perform inter-object interactions between vector objects may be implemented within the scope of the present disclosure.

Turning now to FIG. 8, FIG. 8 illustrates a method 800 for vector object interaction, in accordance with certain embodiments. Initially at block 810, upon detecting a pause in a drag operation, a dragged vector object and a recipient vector object that satisfy an interaction metric are detected. For example, the dragged and recipient vector objects may be identified as overlapping, or within a threshold distance of one another. At block 820, the dragged vector object and the recipient vector object are classified into a corresponding pair of object types. For example, the dragged object and the recipient vector object may be separately classified into one of a plurality of supported object classifications (e.g., path-type vector object, text-type vector object, group-type vector object, image-type vector object, custom-type vector object, etc.), and the combination of the two classifications may define the pair of object types for the dragged object and the recipient vector object. At block 830, a set of candidate interactions associated with the corresponding pair of object types is identified. At block 840, one of the candidate interactions from the set is executed to generate an output vector object with an appearance based on the recipient vector object and the dragged vector object.

Turning now to FIG. 9, FIG. 9 illustrates a method 900 for vector object interaction, in accordance with certain embodiments. Initially at block 910, a pause in a drag operation of a dragged vector object is detected. At block 920, upon detecting the pause, a recipient vector object is identified for which the dragged vector object and the recipient vector object satisfy an interaction metric. For example, a recipient vector object may be identified as overlapping with, or within a threshold distance of, the dragged vector object. At block 930, upon identifying the recipient vector object, a set of candidate interactions between the dragged vector object and the recipient vector object is identified. At block 940, an appearance of the dragged or recipient vector object is adjusted by performing one of the candidate interactions.

Example Operating Environment

Figure 10:
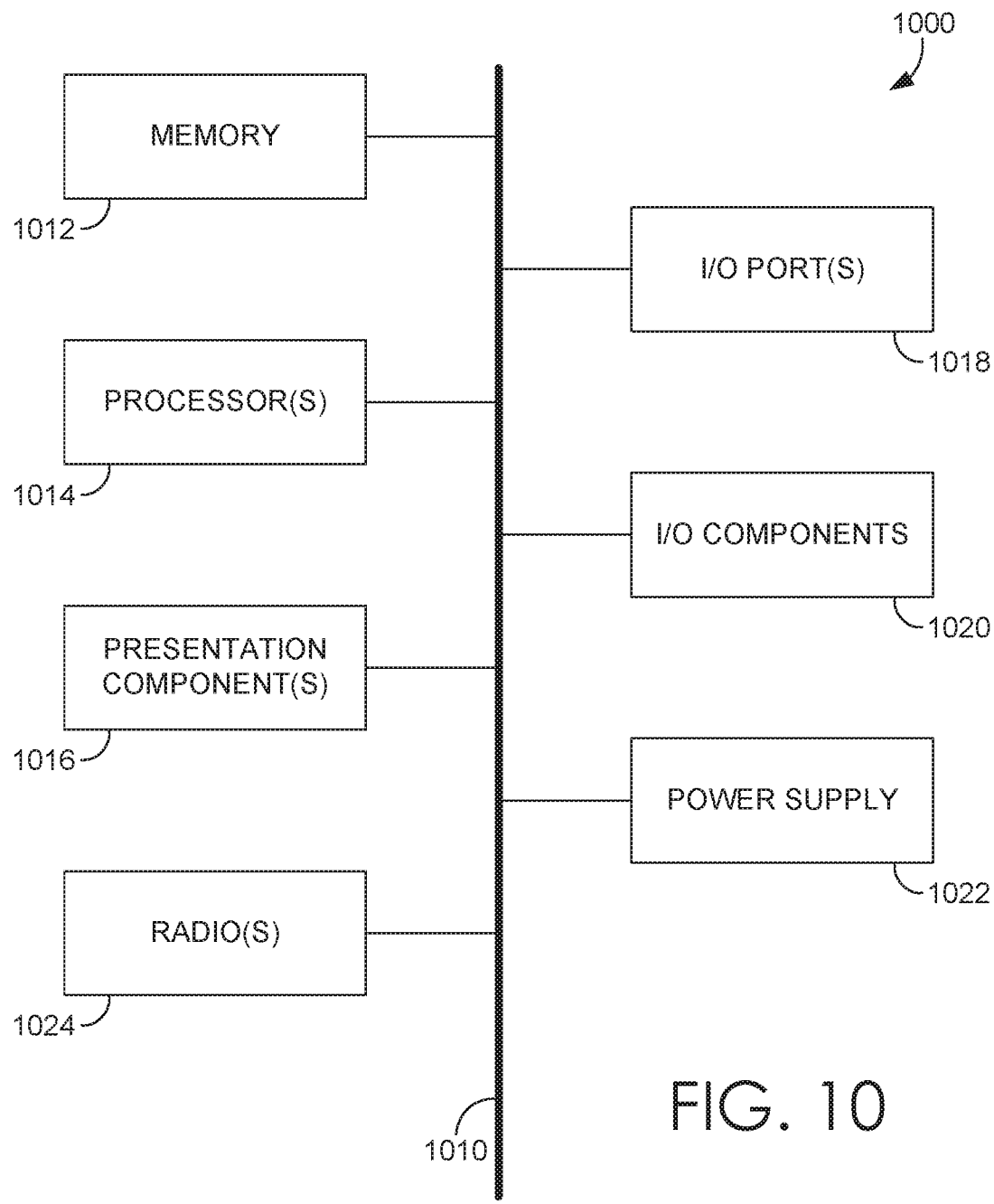
FIG. 10 is a block diagram of an example computing environment suitable for use in implementing certain embodiments.

Having described an overview of certain embodiments, an example operating environment in which certain embodiments may be implemented is described below in order to provide a general context for various aspects of the present invention. Referring now to FIG. 10 in particular, an example operating environment for implementing certain embodiments is shown and designated generally as computing device 1000. Computing device 1000 is but one example of a suitable computing environment and is not intended to suggest any limitation as to the scope of use or functionality of the invention. Neither should computing device 1000 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 10, computing device 1000 includes bus 1010 that directly or indirectly couples the following devices: memory 1012, one or more processors 1014, one or more presentation components 1016, input/output (I/O) ports 1018, input/output components 1020, and illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 10 is merely illustrative of an example computing device that can be used in connection with one or more embodiments. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer-storage media in the form of volatile and/or nonvolatile memory. The memory may be removable, non-removable, or a combination thereof. Example hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Example presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc. The I/O components 1020 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 1000. Computing device 1000 may be equipped with depth cameras, such as stereoscopic camera systems, infrared camera systems, RGB camera systems, touchscreen technology, and combinations of these, for gesture detection and recognition. Additionally, the computing device 1000 may be equipped with accelerometers or gyroscopes that enable detection of motion. The output of the accelerometers or gyroscopes may be provided to the display of computing device 1000 to render immersive augmented reality or virtual reality.

Embodiments described herein support performing inter-object interactions between vector objects. The components described herein refer to integrated components of a vector object interaction system. The integrated components refer to the hardware architecture and software framework that support functionality using the vector object interaction system. The hardware architecture refers to physical components and interrelationships thereof and the software framework refers to software providing functionality that can be implemented with hardware embodied on a device.

The end-to-end software-based vector object interaction system can operate within the vector object interaction system components to operate computer hardware to provide vector object interaction system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the vector object interaction system components can manage resources and provide services for the vector object interaction system functionality. Any other variations and combinations thereof are contemplated within the scope of the present disclosure.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
   upon detecting a pause in a drag operation that picks up and moves a dragged vector object, detecting that the dragged vector object and a recipient vector object satisfy an interaction metric, the dragged and recipient vector objects each comprising one or more vectors that define one or more lines or curves;
   classifying the dragged vector object and the recipient vector object into a corresponding pair of object types, by selecting a pair of object types from a pre-defined plurality of pairs of object types of vector objects;
   identifying a set of candidate interactions associated with the corresponding pair of object types; and
   executing one of the candidate interactions from the set to generate an output vector object with an appearance based on the recipient vector object and the dragged vector object.

2. The one or more computer storage media of claim 1, the operations further comprising pre-defining candidate interactions between pairs of object types selected from the pre-defined plurality of pairs of object types of vector objects.

3. The one or more computer storage media of claim 1, the operations further comprising:
tracking invocation count for each of the candidate interactions; and
identifying the candidate interaction from the set based on an evaluation of the invocation count identifying the candidate interaction as most frequently used in the set.

4. The one or more computer storage media of claim 1, the operations further comprising:
simulating results of the candidate interactions between the dragged and recipient vector objects; and
causing presentation of the simulated results as selectable previews in a ranked order in an interaction preview panel.

5. A method comprising:
detecting a pause in a drag operation that picks up and moves a dragged vector object;
upon detecting the pause, identifying a recipient vector object for which the dragged vector object and the recipient vector object satisfy an interaction metric, the dragged and recipient vector objects each comprising one or more vectors that define one or more lines or curves;
upon identifying the recipient vector object, identifying a pair of object classifications, one for each of the dragged vector object and the recipient vector object, from a plurality of supported pairs of object classifications, and (ii) identifying a set of candidate interactions between the dragged vector object and the recipient vector object based on the pair of object classifications; and
adjusting an appearance of the dragged or recipient vector object by performing one of the candidate interactions.

6. The method of claim 5, wherein identifying the set of candidate interactions between the dragged vector object and the recipient vector object comprises looking up a unique set of candidate interactions associated with the pair of object classifications corresponding to the dragged vector object and the recipient vector object.

7. The method of claim 5, wherein the supported pairs of object classifications comprise path-type vector objects and text-type vector objects.

8. The method of claim 5, further comprising detecting the pause in the drag operation based on a timer elapsing for a threshold pause duration without input velocity of the drag operation or a distance of the drag operation exceeding corresponding thresholds.

9. The method of claim 5, further comprising determining that the interaction metric is satisfied based on a determination that the dragged vector object and the recipient vector object overlap.

10. The method of claim 5, further comprising causing presentation of one or more previews simulating results of the candidate interactions between the dragged vector object and the recipient vector object.

11. The method of claim 5, further comprising causing presentation of simulated results, of the candidate interactions between the dragged and recipient vector objects, as selectable previews in a ranked order in an interaction preview panel.

12. The method of claim 11, further comprising determining the ranked order based on invocation counts of the of the candidate interactions between the dragged and vector recipient vector objects.

13. The method of claim 11, further comprising including a promoted candidate interaction in the ranked order.

14. The method of claim 5, further comprising identifying the candidate interaction for execution, upon detecting release of the drag operation, based on the candidate interaction having been selected from an interaction preview panel or being identified as most frequently used in the set.

15. A computer system comprising one or more hardware processors and memory storing computer program instructions that, when executed by the one or more hardware processors, cause the one or more hardware processors to perform operations comprising:
detecting a pause during a drag operation of a dragged vector object to a recipient vector object, the dragged and recipient vector objects each comprising one or more vectors that define one or more lines or curves;
selecting, from a plurality of pre-defined object classification combinations, an object classification combination that corresponds to the dragged vector object and the recipient vector object; and
performing an inter-object interaction between the dragged vector object and the recipient vector object based on a pre-defined set of candidate interactions mapped to the selected object classification combination.

16. The computer system of claim 15, wherein the plurality of pre-defined object classification combinations comprises two or more of a first combination of path-type and path-type vector objects, a second combination of text-type and path-type vector objects, or a third combination of image-type and group-type vector objects.

17. The computer system of claim 15, the operations further comprising detecting the pause during the drag operation based on a timer elapsing for a threshold pause duration without input velocity of the drag operation or a distance of the drag operation exceeding corresponding thresholds.

18. The computer system of claim 15, the operations further comprising identifying the recipient vector object based on a determination that the dragged vector object and the recipient vector object satisfy an interaction metric.

19. The computer system of claim 15, the operations further comprising causing presentation of simulated results, of the pre-defined set of candidate interactions between the dragged and recipient vector objects, as selectable previews in a ranked order in an interaction preview panel.

20. The computer system of claim 19, the operations further comprising updating the simulated results as the drag operation continues.

* * * * *

UNITED STATES PATENT AND TRADEMARK OFFICE
CERTIFICATE OF CORRECTION

PATENT NO. : 11,301,125 B2
APPLICATION NO. : 16/857696
DATED : April 12, 2022
INVENTOR(S) : Tarun Beri et al.

It is certified that error appears in the above-identified patent and that said Letters Patent is hereby corrected as shown below:

In the Claims

Column 22, Line 54, In Claim 1, delete "types," and insert -- types --.

Column 24, Line 5-6, In Claim 12, delete "of the of the" and insert -- of the --.

Column 24, Line 35, In Claim 16, delete "of" and insert -- of: --.

Signed and Sealed this
Eighth Day of October, 2024

Katherine Kelly Vidal
*Director of the United States Patent and Trademark Office*